March 23, 1971  J. L. McLARTY  3,572,392
THREADED FILAMENT WOUND PIPE AND THE METHOD
OF MANUFACTURE THEREOF
Filed July 9, 1969  2 Sheets-Sheet 1

INVENTOR:
Jack Lowrie McLarty
BY: James R. Hoatson Jr.
Philip T. Liggett
ATTORNEYS ced has a distinct pipe thread with a tolerance between mating threads of .015 inch in pipe having a diameter

United States Patent Office 3,572,392
Patented Mar. 23, 1971

3,572,392
THREADED FILAMENT WOUND PIPE AND THE METHOD OF MANUFACTURE THEREOF
Jack Lowrie McLarty, Milwaukee, Wis., assignor to Universal Oil Products Company, Des Plaines, Ill.
Filed July 9, 1969, Ser. No. 840,403
Int. Cl. F16l 9/16
U.S. Cl. 138—109                           11 Claims

ABSTRACT OF THE DISCLOSURE

An improved threaded filament wound pipe and the method of manufacture thereof. The improvement comprises helically winding resin impregnated fiberglass filaments upon a mandrel knurled at the ends in the form of helical threads. The helical winding pitch is greater than the thread pitch. As a result, the fiberglass filaments alternately deviate in radial disposition with respect to the pipe axis, thereby forming both interior and exterior pipe threads at the ends of the finished pipe.

This invention relates to an improved threaded filament wound pipe and the method of manufacture thereof. More particularly, this invention is the improvement comprising helically winding resin impregnated fiberglass filaments upon a mandrel knurled at the ends in the form of helical threads. The helical winding is at a pitch greater than the thread pitch. The wound fiberglass filaments alternately deviate in radial disposition with respect to the axis thereby forming both interior and exterior pipe threads at the ends of the finished pipe.

In conventional threaded filament wound pipes, the threads are usually cut into the ends of a pipe. While defining distinct threads upon the pipe, this construction has several disadvantages. Since the surface of the pipe is cut in order to form threads thereon, the composition of the thread teeth is substantially parallel chopped fiberglass strands embedded in resin. When the thread teeth are engaged to mating teeth in another member, the forces acting between the faces of the teeth act only in shear against the molecular resin bond, and there are no tensile forces at the teeth acting along the fiberglass filaments of the filament wound pipe. In the present invention, on the other hand, the fiberglass filaments are not broken by cutting and the forces acting between adjacent teeth are acting in tension along the lengths of the fiberglass filaments and in shear across the cross section of each filament, thereby utilizing the strength of the fiberglass filaments instead of merely the strength of the fiber to resin bond which is very low.

The pipe threads formed in this invention are also superior to pipe threads formed in filament wound pipes by winding a number of fiberglass filaments in one axial direction along the helical path which it is desired that the thread follow. In such a case the winding pitch and thread pitch are identical. Such a winding pitch is unsuitable for a well constructed pipe and extensive reprogramming of the filament winding machine is necessary to produce such a winding pitch only at the pipe ends. In addition, the foregoing formation of pipe threads has been largely unsuccessful because the threads formed are so indistinct as to necessitate tolerances that are prohibitively large. As a result, axial slippage occurs between interengaged threads of adjacent pipe sections and the adjacent pipes pull free from one another.

Due to the unique design and the unique manner of manufacture of the pipe of this invention, the pipe produced has a distinct pipe thread with a tolerance between mating threads of .015 inch in pipe having a diameter of at least 4 inches. Adjacent pipe sections with interengaged threads are able to resist large axial and radial forces without slippage.

It is an object of this invention to produce an improved threaded filament wound pipe in which fiberglass filaments are not cut to form either male or female pipe threads.

It is a further object to produce a fiberglass filament wound threaded pipe in which the tolerance of the threads achieved is small enough so that axial slippage of engaged threads does not occur.

Another object is to produce a threaded filament wound pipe in a single continuous helical winding operation and without extra machining operations on the finished pipe and without extensive reprogramming of the filament winding machine to produce the pipe threads.

A related object is to produce filament wound pipe sections which do not require the incorporation of flanges, sleeves, and other separate joining means in order to fasten the pipe sections together. In fact, the pipe of this invention can function as a sleeve itself to join different types of pipe sections together. One of the embodiments of this pipe is used in such an application to serve as a coupling link between a threaded pipe section and an unthreaded section of a pipe. Unthreaded sections of pipe frequently occur when pipe is cut to length on the job site where it is being used. Such a coupling link may be used to join a threaded section of filament wound or steel pipe to a smooth or unthreaded section of pipe.

The improved filament wound pipe sections produced according to this invention may be used for any purpose for which filament wound pipes are currently used, and for additional purposes for which conventional filament wound pipes have heretofore proved unsuitable. One such additional purpose is the use of filament wound pipes as well casings. Heretofore the conventional fastening means for filament wound pipes have not been strong enough to withstand the weight of many sections of filament wound pipes suspended one from another in lowering the pipe into a drilled well hole. The threads of the pipe of this invention are strong enough to withstand the weight of over 250 20 foot sections vertically suspended.

In one broad aspect this invention is a method of making a threaded filament wound pipe comprising at least partially coating with a release agent a mandrel having an unthreaded central portion and having two ends knurled in the form of pipe threads, helically overwinding said mandrel with resin impregnated fiberglass filaments at a winding pitch greater than the pipe thread pitch, thereby forming a filament wound pipe threaded internally and externally at both ends, curing said resin impregnated filaments, and removing at least a part of said mandrel from said filament wound pipe.

In another aspect this invention is, in a threaded filament wound pipe, the improvement comprising pipe threads formed of continuous resin impregnated fiberglass filaments helically overwound at a winding pitch greater than the thread pitch and alternately deviating in radial disposition with respect to the pipe axis, thereby forming the knurls of pipe threads on said pipe.

While the pipe of this invention may have one or more internal or external threaded ends in various combination of configurations, to be most useful, the improved filament wound pipe of this invention has a male end, a central portion, and a female end, and the pitch diameter of the exterior threads formed at the male end of the pipe equals the pitch diameter of the interior threads formed at the female end of the pipe. Using the preferred method of construction, the nominal diameter of one end of the mandrel is smaller than the diameter at the unknurled central portion of the mandrel. This smaller end is used to form the male end of the filament wound pipe. The other end of the mandrel is used to form the female end of the filament wound pipe. The mandrel is placed in a filament winding machine and is helically overwound with resin impregnated fiberglass filaments as has been described. A basic filament wound pipe having a male end, a central portion, and a female end is thereby produced. At the male end of the improved pipe, the filaments are wound in a single continuous pitch thereby forming knurls of both interior and exterior pipe threads on the interior and exterior pipe surfaces.

Prior to curing, the central portion and the female end of the filament wound pipe are overwound with additional resin impregnated fiberglass filaments to provide additional reinforcement in these areas. No reinforcing filament fibers are overwound about the exterior of the male end of the pipe, however, as this would render indistinct the external threads and enlarge the male end so that it would not be engageable in an adjacent female pipe end. The additional fiberglass filaments are overwound about the central portion and female end of the pipe at a reinforcement winding pitch greater than the aforesaid winding pitch used to construct the basic pipe. As a result of this reinforcement winding a pipe is produced with a female end having threads on the interior surface thereof. The exterior of the female end is helically overwound with reinforcing resin impregnated fiberglass filaments at a reinforcement winding pitch greater than the aforesaid initial winding pitch. The knurls on the exterior surface of the female end of the pipe are thereby covered, and the central portion and the female end of the pipe are thereby reinforced.

In a refinement of the aforesaid method of construction, the end of the mandrel having the aforesaid smaller diameter is tapered to converge at its extremity, and the other end of the mandrel is tapered to diverge at its extremity. This produces a pipe tapered at both ends to allow secure force fitting of a male pipe end to an adjacent female pipe end.

Quite often the knurls on the interior surface of the male end of the pipe are covered with a reinforcing filler material bonded to the pipe. This filler material may be incorporated into the pipe in one of several ways. One method of construction of the pipe involves initially coating the entire mandrel with a release agent, and removing the entire mandrel from the pipe subsequent to the curing of the pipe. Afterwards, the threads on the interior surface of the male end of the filament wound pipe are covered with a reinforcing filler material bonded to the pipe. This filler material is normally appiled from the end of the pipe and the pipe opening is afterwards reamed to create a smooth inner pipe bore.

In an alternative method of manufacture, the male end of the mandrel is comprised of a detachable annular ring having an exterior surface knurled in the form of pipe threads and a smooth interior surface, and the central portion and the end of the mandrel upon which the female end of the pipe is formed are coated with a release agent, and the annular ring is left uncoated by the aforesaid release agent. The annular ring thereby becomes bonded to the resin impregnated fiberglass filaments and the remainder of the mandrel is removed from the filament wound pipe subsequent to curing, whereby the annular ring is incorporated into the filament wound pipe. The annular ring is normally initially assembled with the remaining portions of the mandrel by being force fitted over a protrusion from the central portion of the mandrel. After winding and curing, the remaining portion of the mandrel is withdrawn from the annular ring thereby leaving the annular ring as a part of the inner surface of the pipe.

As previously mentioned the preferred embodiment of the filament wound pipe is overwound, prior to curing, both at its central portion and at its female end with additional resin impregnated fiberglass filaments at a reinforcement winding pitch greater than the initial winding pitch, thereby reinforcing the central portion of the pipe end and covering the knurls on the exterior surface of the female end of the pipe. In overwinding the filament wound pipe at the female end, the filaments wound at the larger pitch have a tendency to pass along the thread crests, and thereby bridge the thread roots. This tendency is alleviated because fiberglass filaments do not pass axially along the surface of the pipe but are helically wound at an angle. The circumferential component of the path of the reinforcing filament fibers causes the fiberglass filaments to dip into the thread roots and pass across the flanks of the threads. Although there is no bridging across thread crests in the preferred form of this pipe, the helical winding angle may be decreased further. This will result in a certain amount of tolerable bridging. The winding angle must not be decreased so far that bridging is produced which is serious enough to impair the strengthening effect of the reinforcing fiberglass filaments, however.

A larger included angle at the thread root between adjacent thread flanks will produce a proportionate increase in the winding pitch which can be used before bridging across the pipe threads occurs. Such bridging, other than the small amount which falls within the thread tolerance, cannot exist at the exterior of the male end of the pipe. For this reason, the only upper limit upon the allowable winding pitch of the fiberglass filaments is the pitch at which bridging begins to occur. This upper limit will be increased as the included thread angle and the thread pitch increase and as the distance between the thread root and the thread crest decreases. Preferably, the pipe threads have an included angle greater than 60°.

The lower limit of the filament winding pitch is the pipe thread pitch. Where the filament winding pitch is less than the pipe thread pitch, the threads become indistinct and defective. It has been found that an angle of 72° with respect to the pipe axis is an ideal filament winding angle to form threads having an included angle of 120°. Both the filament winding pitch and the pipe thread pitch will vary, of course, depending upon the pipe diameter.

There need be no taper of the improved filament wound pipe of this invention, though one preferred embodiment of the pipe includes a standard taper of one linear unit in 16. Using this standard taper, five perfect threads on each end of the pipe are normally sufficient to withstand the tensile forces which are large enough to stress the main central portion of the filament wound pipe beyond its elastic limit.

The interior surface of the innermost portion of the female end of the pipe is preferably constructed to slope radially inward to meet the interior surface of the central portion of the pipe. This feature will allow the male end of another pipe section to seat securely within the female end regardless of whether the pipe ends are at the high or low end of the range of diameter tolerances. Besides preventing interplay between the pipe ends, this snug seating arrangement tends to seal the internal passageway formed by the pipes from the outer environment.

The mating ends of the pipe of this invention may be made to seal either permanently or temporarily. If the pipe is to be sealed permanently, either the interior threaded surface of the female end of the pipe, or the exterior threaded surface of the male end of the pipe, or both, may be covered with a plastic cement, which forms a leakproof seal and rigid bond when cured. Where temporary engagement of mating threads is desired, it is often desireable for a sealing material to exist between mating threads without forming a bond between the mating pipe ends. One manner of pipe construction to achieve this purpose utilizes a ring of sealing material positioned circumferentially around the innermost portion of the interior surface of the female end of the pipe and another ring of sealing material positioned circumferentially around the innermost portion of the exterior threads of the male end of the pipe. This sealing material may either be a deformable pipe calking compound, or it may be a curable substance, such as a polyurethane, sprayed onto the appropriate surfaces of the pipe ends. If a flexible polyurethane foam is used, it will bond to the pipe surface when applied, but once cured, will not form a bond with the mating end of another pipe. A sealing material is most effective on the interior surface of the female end of the pipe if it is applied to that portion of the interior surface which is innermost with respect to the central portion of the pipe, that is, to that portion of the female end of the pipe most closely adjacent to the central portion of the pipe. Similarly, the sealing material at the male end of the pipe is most effective if applied to that portion of the exterior surface of the male end which is innermost with respect to the central portion of the pipe, that is, that portion of the male end of the pipe most closely adjacent to the central portion of the pipe. The threads of male and female pipe ends so treated and interengaged are isolated from seepage either into or out of the pipe. The threads themselves are thereby not subject to adverse effects from fluids attempting to find a path of leakage. The major adverse effect to be prevented is a crushing of the male end of the pipe, either by freezing of a liquid in the space between interengaged threads or by a large pressure of a fluid between the interengaged threads as compared to the internal pressure within the pipe sections.

One particular application of the improved threaded filament wound pipe of this invention is as a coupling member between pipes. This is the embodiment in which the filament wound pipe has pipe threads which are internal threads at a first end of the pipe. The opening in the second end of the pipe narrows to form a collar, and there are two holes through the outer wall of the pipe at the collar, within the pipe wall to the collar or through the collar itself. This allows the threaded end of the pipe to be engaged about a mating threaded male end of an adjacent pipe. Another member having a diameter equal to the opening formed by the collar of the pipe is insertable into the second end of the pipe and is bonded therein when an adhesive is applied through one of the holes through the aforesaid pipe wall. This pipe embodiment may be used to join adjacent filament wound pipe sections, steel pipe sections, or pipe sections constructed of other materials. The two holes through the wall of the pipe may be spaced anywhere in the unthreaded portion of the pipe, but preferably the holes are radial and one is spaced near the collar and the other is near the adjacent part of the first or threaded portion of the pipe and is displaced 180° from the first hole.

The pipe in this embodiment is first threadably engaged upon a male end of another pipe member constructed of any material. The unthreaded end of another member, usually the cut end of another pipe section, is inserted into the annular opening formed by the collar until it reaches a stip, which is comprised of a thickness portion of the pipe wall and which separates the threaded from the unthreaded portion of the pipe. A plastic resin, such as epoxy or polyester resin, is then squeezed through one of the holes in the wall of the pipe. The resin fills the space bounded by the stop, the interior of the collar, the interior of the unthreaded portion of the pipe, and the exterior of the inserted unthreaded member. Air escapes through the second hole in the pipe wall, and the emergence of the adhesive through the second hole indicates that the space bounded by the interior of the pipe of this invention and the exterior of an inserted member, has been filled with adhesive. The adhesive is allowed to dry, thereby securely bonding the inserted member to an adjacent pipe section. The adjacent pipe section engaged in the interior threads of the pipe of this invention may be disengaged from the pipe of this invention, but the smooth walled member is firmly bonded to the pipe of this invention.

The preferred embodiments and the methods of manufacture of this invention are more clearly illustrated in the accompanying drawings.

Figure 1:
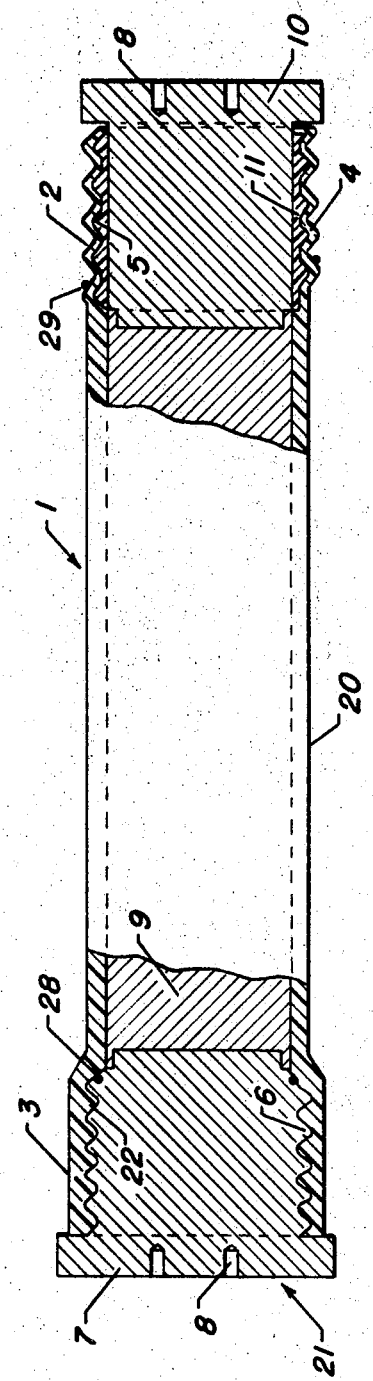
FIG. 1 is a partial sectional view of a preferred embodiment of the pipe of this invention positioned upon a mandrel used in the pipe manufacture.

Referring now to FIG. 1, there is shown a threaded filament wound pipe 1 having a central portion 20 and two threaded pipe ends, male end 2 and female end 3. The pipe, as illustrated, is positioned upon a mandrel assembly 21. The mandrel assembly is comprised of a central smooth surfaced portion 9 into which end portions are force fitted. The male end portion of the mandrel is comprised of a form 10 which is force fitted into a central portion 9 of the mandrel. Around the male portion 10 is positioned a detachable annular ring 11, constructed of a thermoplastic or a plastic resin. Annular ring 11 comprises the other part of the male end portion and has a smooth inner surface, where it contacts form 10. The outer surface of annular ring 11 is covered with helical knurls 5 which are used to form the exterior threads 4 of the male end 2 of pipe 1.

At the other end of mandrel assembly 21 is a female end form 7. Female end form 7 is force fitted into the other end of central mandrel portion 9. From 7 is a member with helical knurls 6 located around its outer surface. These helical knurls 6 are used to form the interior threads 22 of the female end 3 of pipe 1. Both male end form 10 and female end form 7 have machine fastening holes 8 extending axially therein. These machine holes 8 accommodate fastening fingers protruding from a filament winding machine. The fingers are rotated, thereby turning the mandrel assembly 21 and allowing pipe 1 to be filament wound thereon. While end forms 7 and 10 and central portion 9 of mandrel assembly 21 have been depicted as solid members, it is equally possible to use hollow or partially hollow members as well.

Figure 2:
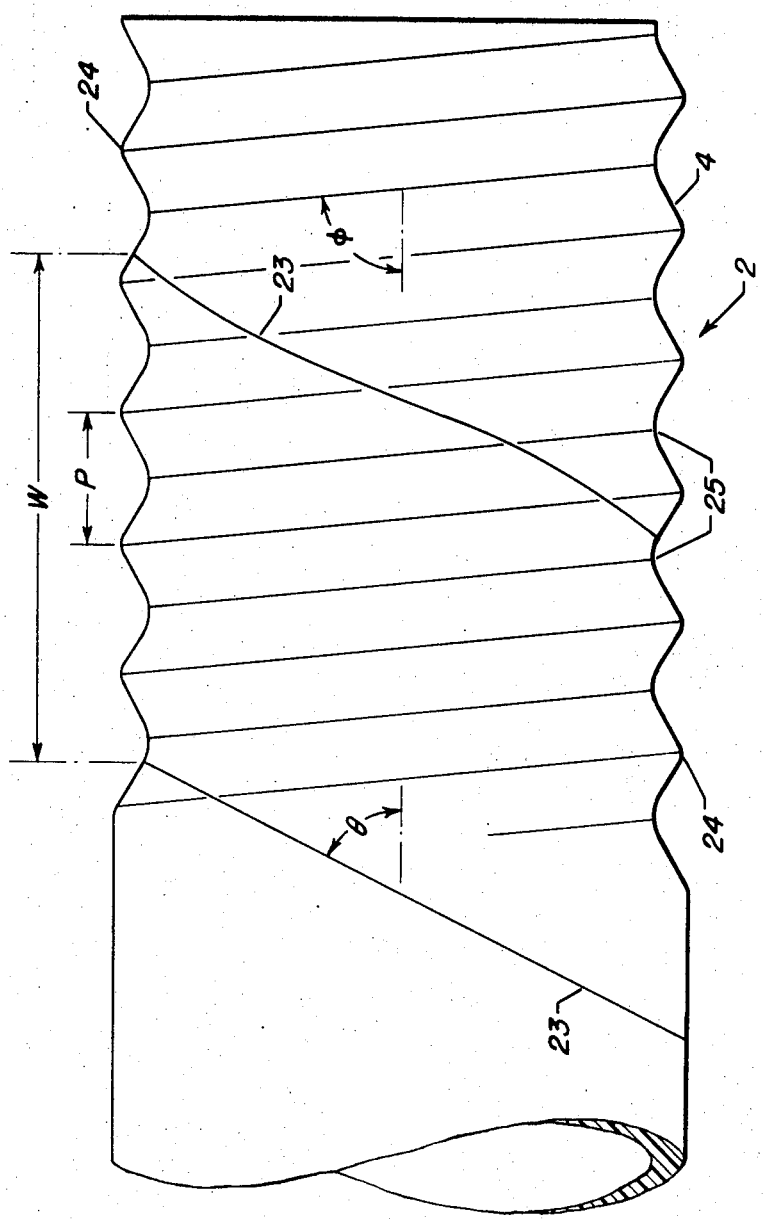
FIG. 2 is an isolated elevational view of the male end of the pipe of FIG. 1.

The combination of angles used in filament winding pipe 1 are best illustrated in FIG. 2. In FIG. 2 the path of a single outer fiberglass filament 23 is illustrated over the extent of its path as it is helically wound from the extreme right towards the left at the male end 2 of pipe 1. It can be seen that filament 23, like all the filaments comprising the ends of the pipe of this invention, alternately deviates in radial disposition with respect to the pipe axis. That is, the filaments are at a smaller radius at the roots 25 of threads 4 than at crests 24 of threads 4. The filament winding angle of filament 23 is significantly smaller than the thread angle $\phi$. Since a smaller helical winding angle, with respect to the axis, results in a greater pitch between adjacent windings on the surface of the cylindrical pipe 1, the pitch of filament winding is greater than the pitch between adjacent threads 4 on male end 2 of pipe 1. In FIG. 2 the filament winding pitch is indicated as the distance W and the thread pitch between threads 2, is illustrated as the distance P.

As filament 23 crosses the crests 24 of threads 4, there is a tendency for it to stretch between crests 24 across the roots 25 of threads 4. The filament winding angle $\theta$, as illustrated, is great enough so that this bridging does not occur; however, it can be seen that if the filament winding angle $\theta$ becomes too small, filament 23 will tend to bridge between adjacent crests 24 across thread roots 25, the flanks of adjacent threads 4. In FIG. 2, the tangential component of the filament winding sufficiently alleviates the tendency towards bridging across the roots 25, and causes filament 23 to dip toward roots 25 and pass along the flanks of adjacent threads. Even if a slight amount of bridging does occur, excess resin from the filaments, such as filament 23, seeps into the roots 25 and thereby provides some support for the filaments. Very little of this bridging can be tolerated before the threads become too indistinct to be serviceable, however, therefore, there is a lower limit beyond which the winding angle θ must not be decreased.

For a given thread configuration, therefore, the pitch of filament winding has an upper and a lower limit beyond which the threads formed will be imperfect and indistinct. Moreover, when reinforcing filaments are wound about the female form 7 of the mandrel assembly 21 to cover the exterior threads 6, a filament winding angle which is too small will cause the crests of the interior threads to be truncated and the interior threads 22 at the female end 3 of pipe 1 will be imperfect. Conversely, a filament winding angle which is too great will cause the threads 4 to have rounded flanks and be indistinct.

Subsequent to formation of the basic pipe, it is often desirable to overwind with additional fiberglass filaments the central portion 20 and the female end 3 of pipe 1 for reinforcement. If this reinforcement winding is at a winding pitch greater than the winding pitch used to form the basic pipe, the threads on the exterior surface of the female end 3 will be obscured, as is illustrated in FIG. 1. More tolerance is allowable in choosing the lower limit of the reinforcement winding angle for the reinforcement filament windings about central portion 20 and female end 3 of pipe 1. This is because the strain placed on the excess resin which seeps into the roots of the exterior threads originally formed by the basic helical winding is much less than at either the exterior teeth 4 of male end 2 or the interior teeth 22 of female end 3. Although in the preferred manner of filament winding there is no bridging across the crest of the exterior of the threads formed at female section 3, a certain amount of bridging is tolerable and excess resin will seep into the roots of the exterior threads at the female end 3 of pipe 1 and a larger winding angle may be used here because the inclusion of small voids or imperfect filling of these threads does not render the pipe seriously defective.

Figure 3:
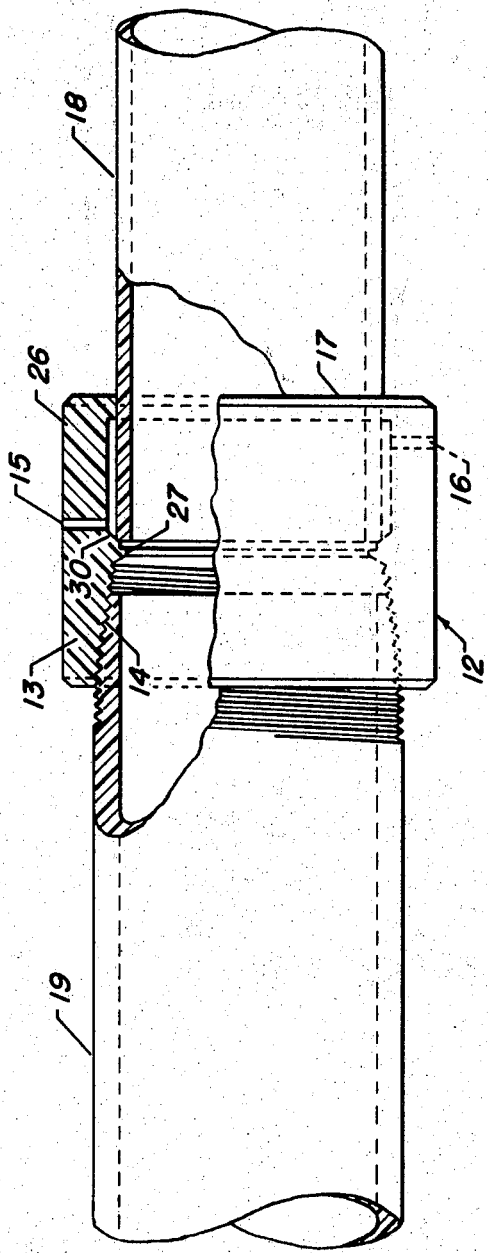
FIG. 3 is a half sectional view of an embodiment of the pipe of this invention used as a coupling member.

Another feature of this invention is illustrated in FIG. 3 in which the filament wound pipe of the invention is designated as pipe 12. Pipe 12 is actually a very short pipe section and is a coupling or sleeve used to join adjacent members 19 and 18. Adjacent member 19 has a threaded male end with exterior threads 14 thereon. Adjacent member 18 has a smooth unthreaded end portion and is normally a cut section of filament wound pipe. Pipe 12 has a first end 13 having interior threads and a second unthreaded end 26 having a collar 17 which narrows to form a smaller hole at this entrance to pipe 12. While collar 17 is depicted in the drawing as an overhanging lip at the extremity of second end 26, a collar could just as easily be formed at some intermediate point within end 26. In such a case, the internal diameter of the unthreaded end increases on either side of the collar, both toward the threaded end and toward the open extremity of the unthreaded end. In use, the threaded end 13 of pipe 12 is engaged about the threads 14 of member 19. Member 18 is then inserted through the opening formed by collar 17 and into pipe 12. Member 18 is restrained in its longitudinal movement by a radially inward sloping portion 30 of end 26 and by a stop 27, which is an enlargement of the wall of pipe 12. Member 18 is thereby snugly positionioned within pipe 12 by collar 17 and sloping portion 30 of the interior wall of pipe 12. Between sloping portion 30 and collar 17 are located holes 15 and 16 through the wall of pipe 12. Holes 15 and 16 are axially displaced from each other and are positioned opposite one another with respect to the pipe axis. An adhesive, such as epoxy resin, is forced through either hole 15 or hole 16 in pipe 12 and fills the space bounded by the exterior of member 18 and the interior of pipe 12. Adhesive is forced into one of the aforesaid holes in the wall of pipe 12 until adhesive begins to appear at the other hole on the opposite of pipe 12. The appearance of resin at this second hole indicates that the entire space bounded by member 18 and the interior of pipe 12 has been filled with adhesive. The adhesive is allowed to cure and member 18 becomes adhesively bonded to pipe 12.

The method of construction of any embodiment of the filament wound pipe of this invention differs significantly from the conventional manner of construction of threaded filament wound pipes, but certain of the steps of construction are the same. As in the construction of other filament wound pipes, a mandrel is first coated with a release agent to insure that the resin impregnated fiberglass filaments do not adhere to the mandrel after curing. Resin impregnated fiberglass filaments are thereafter helically overwound about the mandrel by rotating the mandrel as the filament fibers are fed into the mandrel through a longitudinally traversing arm. The mandrel used in the construction of this filament wound pipe is different from the conventional mandrel, however, in that it has two tapered ends which are knurled to form pipe threads at one or both ends. These knurled ends are separated by an unthreaded smooth central portion of the mandrel. A distinguishing feature of the method of manufacture is that helical winding is carried out at a winding pitch which is greater than the pipe thread pitch, that is, the distance between adjacent knurls on the surface of the pipe. The result of overwinding in this manner is a basic filament wound pipe threaded both internally and externally at the knurled ends of the mandrel. If one of the pipe ends is to be a female pipe end, helical winding is thereafter continued over the central portion of the pipe and over the female end of the pipe but not over the male end of the pipe. This subsequent winding is a reinforcement winding and is carried out at a winding pitch greater than the initial winding pitch used to form the pipe threads. The reinforcement winding thereby covers the knurls on the exterior surface of the female end of the pipe. As previously discussed a slight amount of bridging may occur across the threads on the exterior surface of the female end of the pipe, but this bridging will be within acceptable limits unless the reinforcement winding angle is too small. The reason that the male end of the pipe is not overwound with reinforcing filament fibers is twofold. First, the exterior threads would become blurred and indistinct, thereby rendering the male pipe threads inoperative. Secondly, the diameter of the male end of the pipe would become so enlarged that it would not be engageable in a female end of a pipe constructed in the manner described.

The mandrel used in this invention may be in one of several forms. The mandrel may be constructed to be completely removable from the filament wound pipe constructed thereon. In this case both ends of the mandrel have knurls thereon to form the threads of the filament wound pipe of this invention. Normally, at least one of the ends of the mandrel is slidably removable from the remaining portion of the mandrel so that the parts of the mandrel can be easily unthreaded from the threads formed by the filament wound pipe created, after the filament wound pipe of this invention is cured. A mandrel made in multiple pieces is not a requirement, however, where the threads at both of the pipe ends are built to be engageable. If the entire mandrel is to be reusable, the entire mandrel is initially coated with a release agent. If it is desired to reinforce the male end of the pipe by covering the interior threads of the male end of the pipe with a filler material, this is done subsequent to the removal of the mandrel parts from the filament wound pipe. In this case, filler material, such as resin impregnated chopped strained glass or a resin coated thermoplastic are applied to the interior of the male end of the filament wound pipe and the interior surface created thereby is smoothed to blend into the central body portion of the pipe.

An alternative manner of construction involves a mandrel in which one end of the mandrel becomes incorporated into the filament wound pipe produced thereon. In this case the male end of the mandrel is comprised of a detachable annular ring having an exterior surface knurled in the form of pipe threads and having a smooth interior surface. The exterior of this annular ring is left uncoated by the release agent applied to the remaining portion of the mandrel. As the resin impregnated fiberglass filaments are overwound thereon, the annular ring becomes bonded to these filaments and incorporated into the filament wound pipe produced as an integral part thereof. Such a construction allows the male end of the filament wound pipe to be reinforced without any subsequent finishing operations required after the pipe produced has cured. After curing this embodiment of the pipe, the remainder of the mandrel is removed from the pipe and the annular ring is incorporated into the filament wound pipe of this invention.

To produce the embodiment of the pipe used as a connecting link or sleeve, only slight variations from the method described are necessary. No male portion of the mandrel is necessary, but two radial protrusions extend from the central portion of the mandrel during the filament winding operation so that filaments are wound about these protrusions leaving the openings 15 and 16 in the walls of the filament wound pipe illustrated in FIG. 3. These openings could be produced by a subsequent drilling operation, but such an operation weakens the walls of the pipe. Also, the central mandrel portion must have a circumferentially indented section to form the collar 17 on pipe 12. The collar 17 is formed merely by decreasing the diameter of the mandrel at the unthreaded end of the mandrel to the diameter of the opening which it is desired to produce. All other steps used in the production of such a filament wound pipe are identical to those heretofore described. It should be understood that the method of manufacture of this invention is applicable whether the pipe is threaded at both ends or whether it is merely threaded at a single end and whether the pipe is to have only male ends, only female ends, or one male and one female end. The fiberglass filaments and the resin used in this invention are identical to those commonly used in the art of filament winding. Appropriate resins would include polyester-styrene mixtures as well as epoxy resins.

The foregoing description and illustrations of the method of manufacture and the article produced are for purposes of illustration only, and no unnecessary limitations should be construed therefrom.

I claim as my invention:

1. In a threaded filament wound pipe, the improvement comprising pipe threads formed of continuous resin impregnated fiberglass filaments helically overwound at a winding pitch greater than the thread pitch and alternately deviating in radial disposition with respect to the pipe axis, thereby forming the knurls of pipe threads on said pipe.

2. The improved filament wound pipe of claim 1 further characterized in that said filaments are wound in a single continuous pitch at a male end of said pipe, thereby forming knurls of both interior and exterior pipe threads on the interior and exterior pipe surfaces of said male end of said pipe.

3. The improved filament wound pipe of claim 2 further characterized in that the knurls on the interior surface of said male end of said pipe are covered with a reinforcing filler material bonded to said pipe.

4. The improved filament wound pipe of claim 1 further characterized in that said pipe has a female end having threads on the interior surface thereof, and the exterior of said female end is helically overwound with reinforcing resin impregnated fiberglass filaments at a reinforcement winding pitch greater than the aforesaid winding pitch, thereby covering the knurls on the exterior surface of the female end of said pipe and reinforcing said female end of said pipe.

5. The improved filament wound pipe of claim 1 further characterized in that said pipe has a male end, a central portion, and a female end, and the pitch diameter of the exterior threads formed at said male end of said pipe equals the pitch diameter of the interior threads formed at said female end of said pipe.

6. The improved filament wound pipe of claim 5 further characterized in that the aforesaid pipe threads have an included angle greater than 60°.

7. The improved filament wound pipe of claim 6 further characterized in that the aforesaid pipe has a taper of 1 in 16.

8. The improved filament wound pipe of claim 5 further characterized in that the interior surface of the innermost portion of said female end slopes radially inward to meet the interior surface of said central portion of said pipe.

9. The improved filament wound pipe of claim 8 further characterized in that there is a ring of sealing material circumferentially around the innermost portion of the interior surface of said female end of said pipe and there is a ring of sealing material circumferentially around the innermost portion of the exterior threads of said male end of said pipe.

10. The improved filament wound pipe of claim 1 further characterized in that there are internal threads at a first end of said pipe and the opening in the second end of said pipe narrows to form a collar, and there are two holes through the wall of said pipe at said collar, whereby the threaded end of said pipe is engageable about a mating threaded male end of an adjacent pipe and another member having a diameter equal to the opening formed by said collar in said second end of said pipe is insertable into said second end of said pipe and is bonded therein by adhesive applied through one of the aforesaid holes through the aforesaid pipe wall.

11. In a filament wound pipe, the improvement comprising internal pipe threads at a first end of said pipe formed of continuous resin impregnated fiberglass filaments helically overwound at a winding pitch greater than the thread pitch and alternately deviating in radial disposition with respect to the pipe axis, and an axial opening that narrows to form a collar at said second end of said pipe, and two holes through the wall of said pipe at said collar, whereby the threaded end of said pipe is engageable about a mating threaded male end of an adjacent pipe, and another member having a diameter equal to the opening formed by said collar in said second end of said pipe is insertable into said second end of said pipe and is bonded therein by adhesive applied through one of the aforesaid holes through the aforesaid pipe wall.

References Cited

UNITED STATES PATENTS

| | | | |
|---|---|---|---|
| 2,943,967 | 7/1960 | Simon | 285—390X |
| 3,381,716 | 5/1968 | Michael | 138—109 |
| 3,414,450 | 12/1968 | Graves | 156—195X |

WILLIAM F. O'DEA, Primary Examiner

R. J. SHER, Assistant Examiner

U.S. Cl. X.R.

156—195, 392; 285—355, 390, 423